Aug. 18, 1936. C. R. NORTH 2,051,150
POWER BRAKE DEVICE
Filed Dec. 10, 1935 3 Sheets-Sheet 1
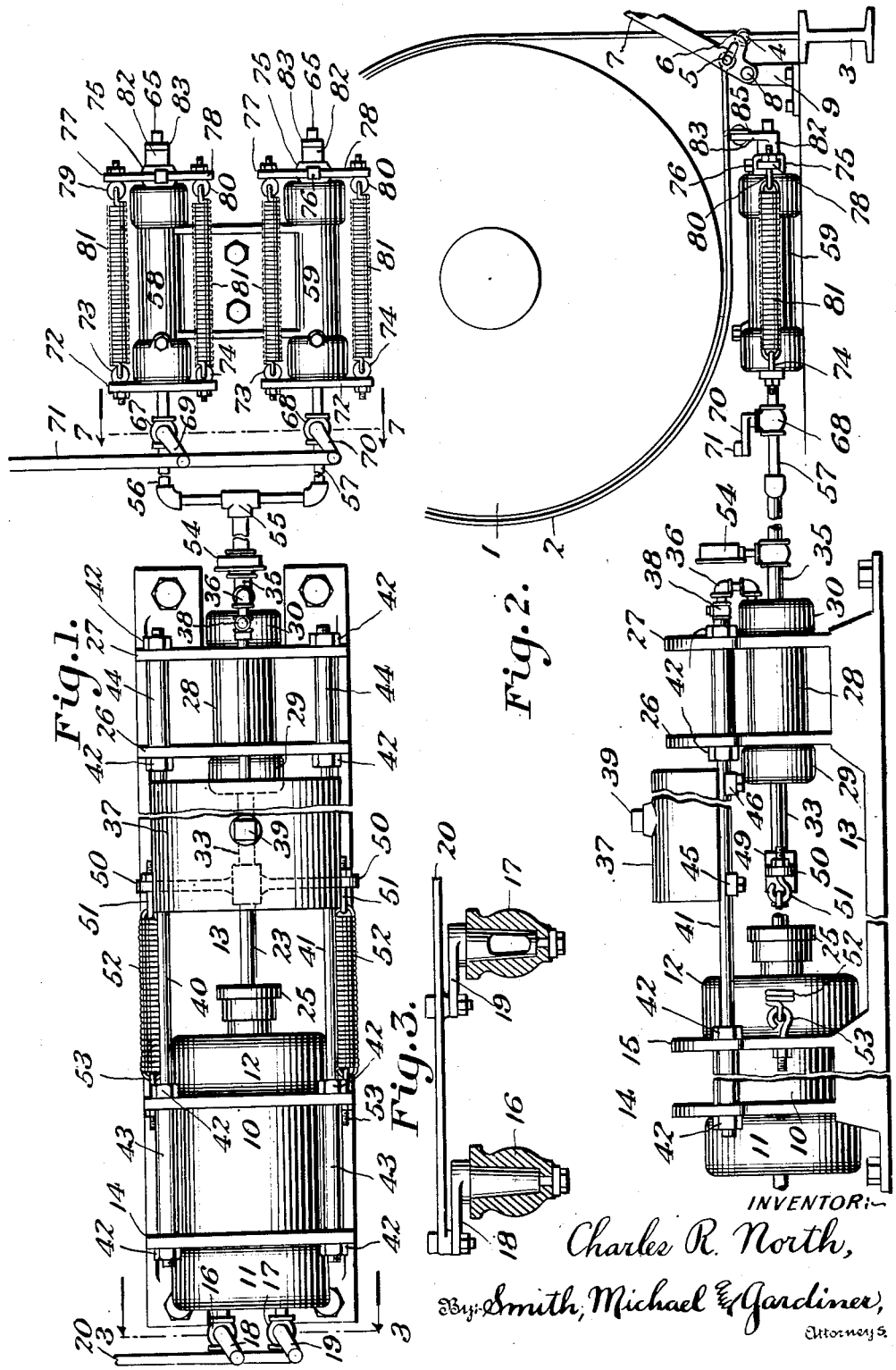
INVENTOR:—
Charles R. North,
By Smith, Michael & Gardiner,
Attorneys

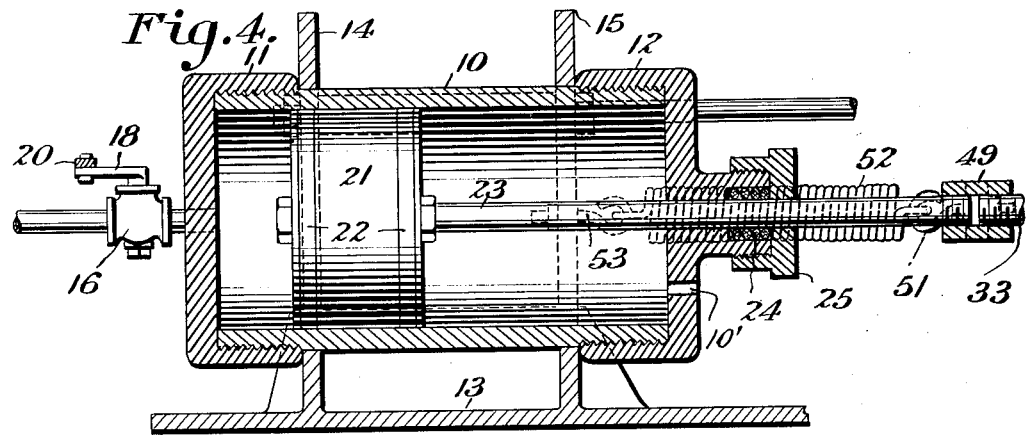
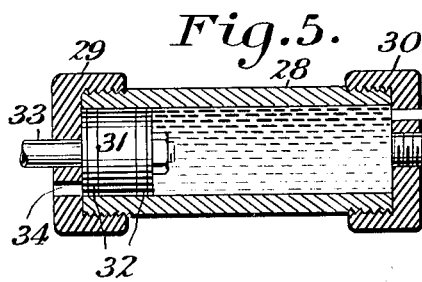
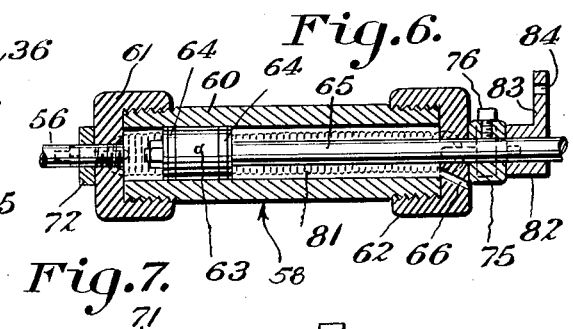
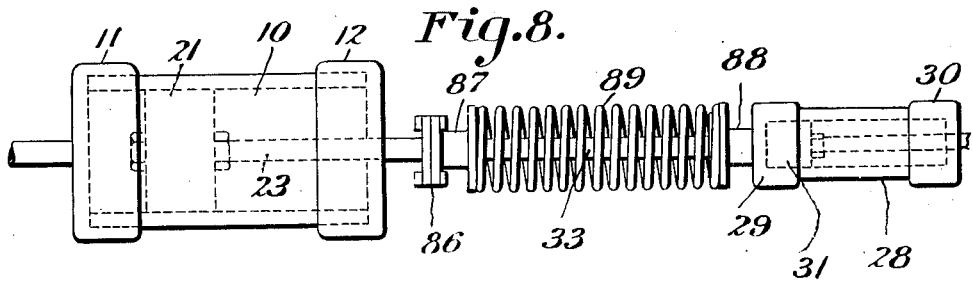

Aug. 18, 1936.   C. R. NORTH   2,051,150
POWER BRAKE DEVICE
Filed Dec. 10, 1935   3 Sheets-Sheet 3
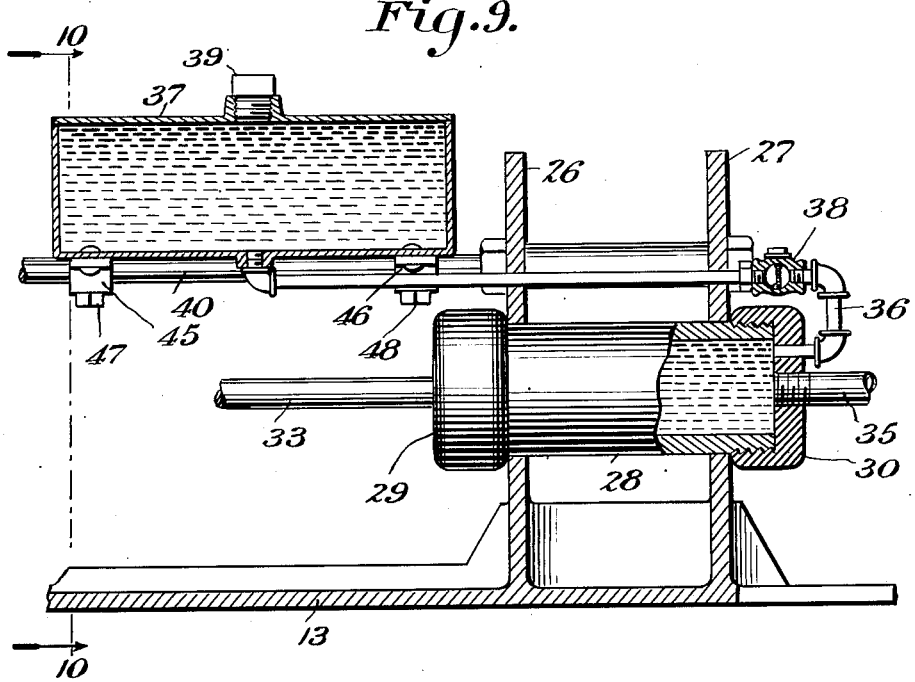
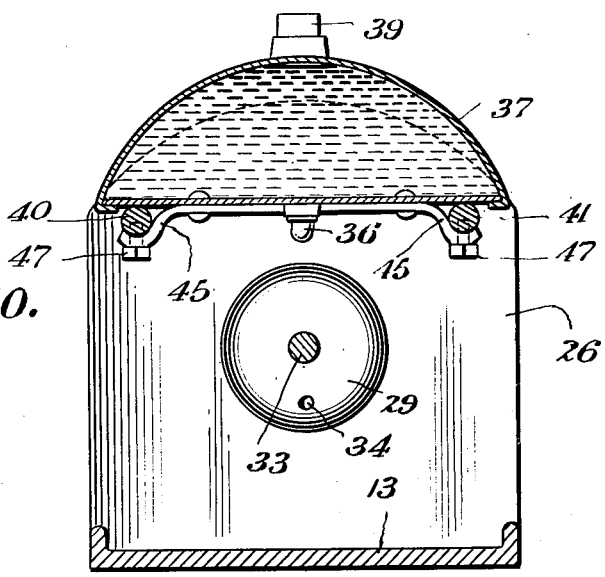
Inventor:—
Charles R. North,
By Smith, Michael & Gardiner,
Attorneys.

Patented Aug. 18, 1936

2,051,150

UNITED STATES PATENT OFFICE 2,051,150

POWER BRAKE DEVICE

Charles R. North, Bruni, Tex.

Application December 10, 1935, Serial No. 53,820

4 Claims. (Cl. 188—151)

My invention relates to a power brake device, and has particular reference to a power brake device primarily intended for use in connection with well drilling apparatus and the like.

During the operation of drilling a well, such as an oil or gas well, it frequently becomes necessary for the operator or driller to insert and withdraw the drill stem from the well and, in the usual construction of well drilling apparatus, the cable drum from which the drill stem is suspended is provided with a brake drum with which is associated a hand-operated lever adapted to force an externally-contracting type of brake band into braking engagement with the brake drum to control and/or arrest the rotation of the cable drum. Due to the great weight of the ordinary drill stem and the great depth of the ordinary oil or gas well, it will be apparent that relatively great manual force is required to apply the brake band to the brake drum to control the speed of rotation of the cable drum and/or to completely arrest the rotation thereof. Cable drums of well drilling apparatus are usually provided with two brake drums, located at opposite ends of the cable drum and with two manually operable brake levers for applying the brake bands to the respective drums. Even by the use of two brake drums, it is extremely difficult, if not impossible, for two or more operators or drillers to manually control the speed of rotation of the cable drum or to maintain the said drum against rotation.

It is an object of my invention to provide a power brake device in which fluid pressure is utilized to actuate the brake band which controls and/or arrests the rotation of the cable drum of well drilling apparatus.

It is an object of my invention to provide a power brake device in which fluid pressure is utilized to force a liquid, such as oil or the like, into a power cylinder located adjacent each brake band, whereby the brake band is forced into braking contact with the brake drum to control or completely arrest the rotation of the cable drum with which the power brake mechanism is associated.

It is an object of my invention to provide a compact and efficient power brake device for well drilling apparatus, which brake device includes a fluid-pressure actuated cylinder, a second cylinder actuated by the fluid pressure cylinder to force a fluid, such as oil or the like, into a third cylinder or set of cylinders, which last-mentioned cylinders effect the actuation of the brake bands, and to associate with said power brake device a novel spring arrangement for releasing the brake bands from the brake drums and returning the parts of the power brake device to their normal, inoperative positions.

It is a further object of my invention to provide means whereby the fluid can be retained in the brake actuating cylinder or cylinders to thus maintain the brake bands in locked position on the brake drums to positively prevent rotation of the cable drum.

It is a still further object of my invention to provide a power brake device that is simple in construction and operation, capable of attachment to the manually-operated brake device usually employed in connection with the well drilling apparatus of the prior art, and to provide a power brake device which is highly efficient in the purposes for which designed.

Referring to the accompanying drawings forming a part of this specification, and wherein, for the purpose of illustration, I have shown a preferred embodiment of my invention:

Figure 1 is a plan view of the preferred form of power brake device forming the subject-matter of my present application, Fig. 2 is a side elevation of the power brake device illustrated in Fig. 1 and showing the same attached to the external contracting brake bands on the cable drum of a standard well drilling apparatus, Fig. 3 is a sectional view on the line 3—3 of Fig. 1, Figs. 4, 5 and 6 are vertical sectional views, respectively, of the main power cylinder, the fluid expelling cylinder operated by said main power cylinder, and one of the brake actuating cylinders operated by the fluid expelling cylinder to actuate the brake band into engagement with the brake drum, Fig. 7 is a sectional view on the line 7—7 of Fig. 1, Fig. 8 is a side elevation of the main power cylinder and the fluid expelling cylinder showing a modified spring arrangement for returning the pistons operating within said cylinders to their normal, inoperative positions, Fig. 9 is a vertical sectional view showing the fluid expelling cylinder partly in section and showing the supply tank associated with said fluid expelling cylinder for supplying fluid, such as oil or the like, to the fluid expelling cylinder, and Fig. 10 is a vertical sectional view on the line 10—10 of Fig. 9.

In the accompanying drawings, wherein like numerals are employed to designate like parts throughout the several views, the numeral 1 designates a brake drum attached to one end of the cable drum of a standard well drilling apparatus. Encircling the brake drum is a brake band 2 of the external-contracting type, one end of said band being fixed to the base structure 3 by a connection 4, and the opposite end being connected to a cross pin 5 positioned within an elongated slot 6 in a lever 7 pivoted at its lower end at 8 to a bracket 9 fixed on the base structure 3. It will be obvious to one skilled in the art that by moving the lever 7 in a clockwise direction about its pivotal mounting 8, the brake band 2 will be forced into frictional engagement with the periphery of the brake drum 1 to either slow up or completely arrest the rotation of said brake drum and the cable drum to which it is attached.

My improved power brake device for positively actuating the brake bands 2 comprises a main power cylinder consisting of a cylindrical sleeve portion 10 externally threaded at its opposite ends and provided with internally threaded head or closure members 11 and 12, adapted to be screwed onto opposite ends of said sleeve portion 10. As a preferred means of mounting the main power cylinder, I provide an elongated base member 13 having near one end thereof a pair of spaced, upstanding, rectangular plates 14 and 15. The plates 14 and 15 are provided with aligned openings slightly greater in diameter than the external diameter of the sleeve portion 10. When assembling the main power cylinder upon the base member 13, the sleeve portion 10 is passed through the aligned openings in the plates 14 and 15 and the head or closure members 11 and 12 are screwed onto opposite ends of said sleeve portion 10 until the inner ends of said head or closure members abut against the outer faces of the plates 14 and 15, respectively, thus retaining the main power cylinder in fixed position upon the base member 13. The head or closure member 11 is provided with a pair of spaced apertures, to one of which is connected the inlet valve 16 leading from a source of fluid pressure, and to the other of which is connected an exhaust valve 17 leading to atmosphere. The valves 16 and 17 are preferably of the rotary plug type and, while such valves may be individually or independently operated, they are preferably arranged so that the opening or passage through one plug is disposed at right angles to the opening or passage through the other plug. By pivotally connecting the valve operating handles 18 and 19 to a common operating rod 20, it will be obvious that the two valves can be operated from a remote position, and that reciprocation of the operating rod 20 will alternately open and close the respective valves, i. e., when the operating rod 20 is moved to open the valve 16 to admit fluid pressure into the main power cylinder, the valve 17 will be closed, and when the operating rod is moved to open the exhaust valve 17, the valve 16 will be closed. Within the main power cylinder is a piston 21 provided with suitable packing rings 22 and connected to a piston rod 23 which extends through an opening in the head or closure member 12 and is screw-threaded at its outer end. In order to prevent the escape of fluid pressure from the main power cylinder, I provide a packing 24 adapted to be compressed into firm engagement with the piston rod 23 by means of the packing nut 25. The head or closure member 12 is provided with an opening 10' to permit the entry and escape of air as the piston 21 moves back and forth within the cylinder 10.

At that end of the base member 13 opposite the main power cylinder, I provide a pair of spaced, upstanding, rectangular plates 26 and 27 provided with aligned openings of a diameter slightly greater than the external diameter of the fluid-ejecting cylinder, which cylinder comprises a sleeve portion 28 screw-threaded at its opposite ends and provided with internally threaded head or closure members 29 and 30, adapted to screw onto opposite ends of the sleeve portion 28. In order to mount the fluid-ejecting cylinder upon the base member 13, I pass the cylindrical sleeve portion 28 through the aligned openings in the plates 26 and 27 and screw the head or closure members 29 and 30 onto opposite ends of said sleeve portion until the inner ends of said head or closure members abut against the outer faces of the plates 26 and 27, respectively, thus retaining the fluid-ejecting cylinder in fixed position upon the base member 13. Within the fluid-ejecting cylinder above described, I provide a piston 31 having suitable packing rings 32 and provided with a piston rod 33 which piston rod extends through a centrally-positioned aperture in the head or closure member 29. The head or closure member 29 is provided with an opening 34 to permit the entry and escape of air as the piston 31 moves back and forth within the cylinder. The head or closure member 30 is provided with a pair of openings, into one of which is threaded a pipe 35, and into the other of which is connected a pipe 36 which leads to a fluid supply tank 37 positioned above the fluid-ejecting cylinder, the pipe 36 being provided with a check valve 38 which permits the fluid, such as oil or the like, to flow from the tank 37 to the fluid-ejecting cylinder but which is effective to prevent the flow of fluid from said cylinder to the said tank. The tank 37 is provided with a removable plug 39, which, when removed, permits oil or other fluid to be introduced into the tank.

In order to strengthen the supporting structure and to provide a ready means for supporting the supply tank 37 in a position above the fluid-ejecting cylinder, I provide a pair of rods 40 and 41 which pass through aligned apertures near the side edges of the plates 14, 15, 26 and 27. These rods 40 and 41 are threaded at their opposite ends and intermediate their lengths to receive nuts 42, and to further strengthen the supporting structure, I provide a pair of spacing sleeves 43 and 44 placed upon the rods 40 and 41, respectively, and positioned between each of the upstanding plates 14 and 15, and 26 and 27. As a convenient means for supporting the tank 37 in a position above the fluid-ejecting cylinder, I secure to the bottom of said tank pairs of spaced clamps 45 and 46, the outer or free ends of which engage beneath the rods 40 and 41, to which rods they are rigidly secured by means of bolts 47 and 48 which pass through the openings in the clamps 45 and 46 and are threaded into openings in the said rods 40 and 41.

The piston rods 23 and 33 extend toward each other in axial alignment and their outer, free ends are secured together by means of a coupling 49, into which the ends of the two piston rods are threaded. This coupling 49 is provided with radially extending, horizontal arms 50, at the outer ends of which are secured hook members 51, to which are secured relatively strong tension springs 52, the opposite ends of which are secured to hook members 53 which are bolted to the upstanding plate 15. The length of the springs 52 is such that they are not extended or placed under tension when the piston 21 is positioned at the left hand end of the main power cylinder, as viewed in Figs. 1, 2 and 4. It will be obvious that as the piston 21 moves toward the fluid-ejecting cylinder, these springs 52 are placed under tension, and that when fluid pressure is released from within the main power cylinder, these springs contract and are effective to return the pistons within the main power cylinder and within the fluid-ejecting cylinder, to their normal, inoperative positions.

The pipe 35 connected to the fluid-ejecting cylinder, is provided with a pressure gauge 54 and is connected by means of a T-coupling or union 55, to two branch pipes 56 and 57 which lead to a pair of brake-actuating cylinders 58 and 59, respectively. Each of the said brake-actuating cylinders 58 and 59, comprises a cylindrical sleeve portion 60 externally threaded at its opposite ends and provided with internally threaded head or closure members 61 and 62, adapted to be screwed onto opposite ends of said sleeve portion 60. Within each of the cylinders 58 and 59 is a piston 63 provided with suitable packing rings 64 and connected to a piston rod 65 which extends through an opening in the head or closure member 62, which member 62 is also provided with an aperture 66 to permit entry and escape of air as the piston 63 moves back and forth within the cylinder. The branch pipes 56 and 57 extend into and through the head or closure member 61 of each of the respective brake-actuating cylinders 58 and 59, each of the branch pipes 56 and 57 being provided with a valve 67 and 68, respectively. The valves 67 and 68 are preferably of the rotary plug type and while such valves may be individually or independently operated, they are preferably arranged so that the opening or passage through one plug is parallel to the opening or passage through the other plug. By pivotally connecting the valve operating handles 69 and 70 to a common operating rod 71, it will be obvious that the two valves 67 and 68 can be operated from a remote position, and that reciprocation of the operating rod 71 will simultaneously open or close the two valves 67 and 68. Each of the pipes 56 and 57 passes through a horizontally-extending, centrally-apertured, cross bar 72 which abuts against the outer face of the head or closure member 61 of each cylinder 58 and 59, and which is provided with a pair of hook members 73 and 74 which pass through suitable apertures near the outer ends of each cross bar. The piston rod 65 of each cylinder 58 and 59 passes through a sleeve member 75 which is rigidly secured to the said rod by means of a set screw 76. Each sleeve member 75 carries a pair of radially-extending, horizontal arms 77 and 78, at the outer ends of which are secured hook members 79 and 80. A relatively strong tension spring 81 extends between the hook members 73 and 79 and 74 and 80, the length of each spring 81 corresponding substantially to the length of the cylinders 58 and 59, i. e., the length of each spring 81 is such that when the piston 63 is in the position shown in Fig. 6, the spring 81 is not extended or placed under tension. With this arrangement, it will be obvious that as the piston 63 is forced toward the right as viewed in Fig. 6, each spring 81 will be stretched or placed under tension, and when the pressure within the cylinder is relieved, each spring 81 will contract and will return the pistons 63 to their normal, inoperative positions. The outer free end of each piston rod 65 is provided with a sleeve member 82, keyed or otherwise secured to said rod, each sleeve member 82 having an upwardly-extending arm 83 provided near its upper end with an aperture 84 through which is passed and secured a bolt, rivet or the like to secure the said upstanding arm to a lug 85 depending from the brake band 2.

In Fig. 8 of the accompanying drawings, I have shown an alternative construction in which the springs 52 have been omitted and a novel spring arrangement provided for returning the pistons 21 and 31 to their normal, inoperative positions within the main power cylinder and fluid-ejecting cylinder, respectively. In this form of my invention, a bolted-flange type of coupling 86 secures the adjacent ends of the piston rods 23 and 33 together. A flanged sleeve member 87 is mounted on the rod 33 adjacent the coupling 86 and a second flanged sleeve member 88 is mounted on the rod 33 adjacent the head or closure member 29 of the fluid-ejecting cylinder. Positioned between the flanged sleeve members 87 and 88 and surrounding the piston rod 33, is a relatively heavy compression spring 89. It will be obvious that as fluid pressure is introduced into the main power cylinder the piston 21 and the rod 23 secured thereto will be forced toward the fluid-ejecting cylinder. This movement of the piston rod 23 will, through the coupling 86, force the piston rod 33 and the piston 31 carried thereby into the fluid-ejecting cylinder. Such movement will compress the spring 89 between the flanged sleeve members 87 and 88, it being obvious that when fluid pressure within the main power cylinder is released, said spring will expand from its compressed condition which will result in the return of the pistons 21 and 31 to their normal, inoperative positions.

It is believed that the operation of the power brake device above described will be readily apparent to one skilled in the art from a consideration of the above described construction. Suffice it to say that when it is desired to control the rotation of the cable drum of the well drilling apparatus by application of the brake band 2 to the brake drum 1, fluid pressure, such as steam, compressed air or the like, is admitted to the main power cylinder by actuation of the control rod 20 which moves the inlet valve 16 to open position and simultaneously closes the exhaust valve 17. The fluid pressure admitted to the main power cylinder forces the piston 21 and the piston rod 23 attached thereto, toward the right as viewed in Fig. 4, this movement expanding or extending the springs 52. As the piston 21 is forced out of the main power cylinder, the connection between the piston rods 23 and 33 causes the piston 31 within the fluid-ejecting cylinder, to move toward the right as viewed in Fig. 5, thus expelling the oil or other fluid from the said cylinder, through the pipes 35, 56 and 57 into the brake-actuating cylinders 58 and 59. During this operation, it is assumed that the rod 71 has been actuated to simultaneously open the valves 67 and 68. By observing the pressure gauge 54, the operator may determine the degree of pressure of the oil or other fluid forced through the pipes 35, 56 and 57 into the brake-actuating cylinders 58 and 59 and may regulate or control the valve 16 to obtain the desired brake action. As the oil or other fluid is forced into the brake-actuating cylinders, 58 and 59 the pistons 63 therein are moved toward the right as viewed in Fig. 6, thus ejecting the piston rods 65 from the ends of the cylinders, and placing the springs 81 under tension. The outward movement of the piston rods 65 operates through the connections 82, 83, 84 and 85, to move the brake band 2 toward the right as viewed in Fig. 2, this action resulting in the contracting of the brake band into frictional contact with the periphery of the brake drum 1 to slow down or completely arrest the rotation of the said drum and the cable drum to which it is attached. If it is desired to maintain the cable drum in non-rotating position, the valves 67 and 68 are simultaneously actuated to closed position by the rod 71, thus retaining the oil or other fluid within the brake-actuating cylinder and locking the brake drum against rotation.

When it is desired to release the brake band 2 from contact with the brake drum 1, the actuating rod 20 is moved to close the inlet valve 16 and open the exhaust valve 17. This permits the steam or other pressure fluid to escape from the main power cylinder, whereupon the springs 52 will function to return the piston 21 to its normal, inoperative position. Assuming that the valves 67 and 70 are open, the movement of the piston 21 into the main power cylinder will likewise draw the piston 31 of the fluid-ejecting cylinder into its normal, inoperative position, this movement of the piston 31 drawing the oil or other fluid from the brake-actuating cylinders 58 and 59 and permitting the springs 81 to return the pistons 63 and the parts carried thereby to their normal, inoperative positions. As the piston 63 moves into the brake-actuating cylinders 58 and 59 the brake band is removed from frictional contact with the periphery of the brake drum 1, thus permitting rotation of the brake drum and the cable drum to which said brake drum is attached. In the event of failure of the power brake device, or if for any reason it should not be desired to actuate the brake by means thereof, it will be obvious that the lever 7 may be manually actuated to force the brake band 2 into contact with the brake drum. Referring to the modified construction shown in Fig. 8, it will be obvious that the spring 89 will be effective to return the pistons 21 and 31 to their normal, inoperative positions following the opening of the exhaust valve 17 and the escape of fluid pressure from within the main power cylinder, i. e., in this modified construction the spring 89 accomplishes the same results accomplished by the springs 52 above referred to.

It will be understood that the forms of my invention herein shown and described are to be taken as preferred embodiments of my invention and that various changes in the detailed construction and operation may be resorted to without departing from the spirit of my invention or the scope of the subjoined claims.

Having thus described my invention, I claim:

1. A power brake device for actuating a brake band into frictional contact with a brake drum, said device comprising a base structure having a pair of spaced, apertured, upstanding plates, the apertures in the plates being in horizontal alignment; a fluid pressure actuated main power cylinder comprising a central portion passing through the aligned apertures in the plates and extending beyond the outer faces of said plates, and head or closure members secured to said central portion at opposite ends thereof, said head or closure members having portions contacting the outer faces of said plates to rigidly support the main power cylinder in position on said plates, said main power cylinder having a piston therein with a piston rod extending to the exterior of said cylinder; a fluid-ejecting cylinder having a piston therein with a piston rod extending to the exterior of the cylinder; means for connecting the piston rods so that fluid pressure admitted to the main power cylinder will eject the fluid from the fluid-ejecting cylinder; and a brake-actuating cylinder receiving fluid under pressure from said fluid-ejecting cylinder and having a piston therein with a piston rod extending to the exterior of the said cylinder, said piston rod being connected to the brake band to force said band into frictional contact with said brake drum.

2. A power brake device for actuating a brake band into frictional contact with a brake drum, said device comprising a base structure having 20 spaced pairs of apertured, upstanding plates, the apertures in each pair of plates being in horizontal alignment; a fluid pressure actuated main power cylinder comprising a central portion passing through the aligned apertures in one pair of plates and extending beyond the outer faces of said plates, and head or closure members secured to said central portion at opposite ends thereof, said head or closure members having portions contacting the outer faces of said plates to rigidly support the main power cylinder in position on said plates, said main power cylinder having a piston therein with a piston rod extending to the exterior of the cylinder; a fluid-ejecting cylinder comprising a central portion passing through the aligned apertures in the other pair of plates and extending beyond the outer faces of said plates, and head or closure members secured to said central portion at opposite ends thereof, said head or closure members having portions contacting the outer faces of said plates to rigidly support the fluid-ejecting cylinder in position on said plates, said fluid-ejecting cylinder having a piston therein with a piston rod extending to the exterior of the cylinder; means for connecting the piston rods so that fluid pressure admitted to the main power cylinder will eject the fluid from the fluid-ejecting cylinder; and a brake-actuating cylinder receiving fluid under pressure from said fluid-ejecting cylinder and having a piston therein with a piston rod extending to the exterior of the said cylinder, said piston rod being connected to said brake band to force the band into frictional contact with said brake drum.

3. A power brake device for actuating a brake band into frictional contact with a brake drum, said device comprising a base structure having upstanding plates near opposite ends thereof; a fluid pressure actuated, main power cylinder supported by one of said plates and having a piston therein with a piston rod extending to the exterior of the cylinder; a fluid-ejecting cylinder supported by the other of said plates and having a piston therein with a piston rod extending to the exterior of the cylinder; a reinforcing and strengthening rod extending through said upstanding plates with clamping nuts secured to the ends of said rod and bearing against the outer faces of said plates, means for connecting the piston rods so that fluid pressure admitted to the main power cylinder will eject the fluid from the fluid-ejecting cylinder; and a brake-actuating cylinder receiving fluid under pressure from said fluid-ejecting cylinder and having a piston therein with a piston rod extending to the exterior of the said cylinder, said piston rod being connected to said brake band to force the band into frictional contact with said brake drum.

4. A power brake device for actuating a brake band into frictional contact with a brake drum, said device comprising a base structure having upstanding plates near opposite ends thereof; a fluid pressure actuated, main power cylinder supported by one of said plates and having a piston therein with a piston rod extending to the exterior of the cylinder; a fluid-ejecting cylinder supported by the other of said plates and having a piston therein with a piston rod extending to the exterior of the cylinder; a pair of reinforcing and strengthening rods positioned above said fluid-ejecting cylinder and extending through said upstanding plates near the upper and outer corners thereof with clamping nuts secured to the ends of said rods and bearing against the outer faces of said plates; a supply tank supported on said reinforcing and strengthening rods and connected to said fluid-ejecting cylinder for supplying fluid thereto; means for connecting the piston rods so that fluid pressure admitted to the main power cylinder will eject the fluid from the fluid-ejecting cylinder; and a brake-actuating cylinder receiving fluid under pressure from said fluid-ejecting cylinder and having a piston therein with a piston rod extending to the exterior of the said cylinder, said piston rod being connected to said brake band to force the band into frictional contact with said brake drum.

CHARLES R. NORTH.